United States Patent
Kobayashi et al.

(10) Patent No.: US 8,086,045 B2
(45) Date of Patent: Dec. 27, 2011

(54) IMAGE PROCESSING DEVICE WITH CLASSIFICATION KEY SELECTION UNIT AND IMAGE PROCESSING METHOD

(75) Inventors: Koji Kobayashi, Kanagawa (JP);
Yukiko Yamazaki, Kanagawa (JP);
Hirohisa Inamoto, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 988 days.

(21) Appl. No.: 11/783,866

(22) Filed: Apr. 12, 2007

(65) Prior Publication Data
US 2007/0242902 A1    Oct. 18, 2007

(51) Int. Cl.
*G06K 9/62* (2006.01)
*H04N 1/00* (2006.01)

(52) U.S. Cl. ......... 382/224; 382/305; 358/403; 706/20

(58) Field of Classification Search .................. None
See application file for complete search history.

(56) References Cited

U.S. PATENT DOCUMENTS

| | | | | |
|---|---|---|---|---|
| 5,463,773 A | * | 10/1995 | Sakakibara et al. | 1/1 |
| 5,553,277 A | * | 9/1996 | Hirano et al. | 707/999.104 |
| 5,701,469 A | * | 12/1997 | Brandli et al. | 707/999.102 |
| 5,726,898 A | * | 3/1998 | Jacobs | 700/231 |
| 6,009,442 A | * | 12/1999 | Chen et al. | 715/205 |
| 6,996,575 B2 | * | 2/2006 | Cox et al. | 707/739 |
| 2001/0013954 A1 | * | 8/2001 | Nagai et al. | 358/444 |
| 2006/0288278 A1 | | 12/2006 | Kobayashi | |

FOREIGN PATENT DOCUMENTS

| | | |
|---|---|---|
| CN | 1519757 A | 8/2004 |
| EP | 1 443 428 A2 | 8/2004 |
| JP | 10-162020 | 6/1998 |
| JP | 2000-285141 | 10/2000 |

* cited by examiner

*Primary Examiner* — Bhavesh Mehta
*Assistant Examiner* — Barry Drennan
(74) *Attorney, Agent, or Firm* — Dickstein Shapiro LLP

(57) ABSTRACT

An image processing device is disclosed that classifies images in an image database and displays the classified images for searching, and is able to easily narrow a range of candidate images and improve operability. The image processing device includes a first classification unit, a display image controller that generates a display image for displaying a status of the classification performed by the first classification unit; a second classification unit that enables a user to select one or more categories included in the display image, and classifies image documents included in a selected category; a detection unit that detects a searching status; and a classification key selection unit that selects a classification key for the second classification unit in response to detection results of the detection unit.

15 Claims, 15 Drawing Sheets

FIG.9A

| PREVIOUS CLASSIFICATION KEY / NUMBER OF DOCUMENTS | MORE | LESS |
|---|---|---|
| — | DOCUMENT TYPE | DOCUMENT TYPE |
| DOCUMENT TYPE | REFER TO FIG. 9B | REFER TO FIG. 9B |
| LAYOUT | SHAPE | COLOR |
| COLOR | LAYOUT | SHAPE |
| SHAPE | COLOR | LAYOUT |

FIG.9B

| CURRENT CATEGORY / NUMBER OF DOCUMENTS | MORE | LESS |
|---|---|---|
| ARTICLE | LAYOUT | LAYOUT |
| JOURNAL | LAYOUT | LAYOUT |
| BILL | LAYOUT | SHAPE |
| DRAWING | LAYOUT | SHAPE |
| PRESENTATION | COLOR | COLOR |

IMAGE PROCESSING DEVICE WITH CLASSIFICATION KEY SELECTION UNIT AND IMAGE PROCESSING METHOD

BACKGROUND OF THE INVENTION

1. Field of the Invention

The present invention relates to an image processing device having a similar image searching function which considers layout features of an image document, and an image processing method for such an image processing device, and particularly, the present invention relates to a technique suitable for a multiple function peripheral, a file server, or an image processing program.

2. Description of the Related Art

It is well known that documents printed on paper can be transformed into digital data by using a scanner or other input devices. For example, in the related art, a device for electrical filing can be used for this purpose; but the electrical filing device is exclusively used for industrial purposes to process a large amount of paper documents.

In recent years, along with lowered prices of scanners, spreading usage of Multi-Function Peripherals (MFP), and progress in rulemaking on electrical documents, the electrical filing technique is widely accepted even in usual offices because of the good handing performance and convenience thereof, and it is becoming more and more common to use the electrical filing technique to transform paper documents into electrical data. In addition, it is becoming more and more common to store the electrical data of image documents in the form of a database (an image database) for management. For example, even when it is necessary to store the original paper documents, for purposes of easy management, usually people still construct databases.

Among the image document databases, there are large scale databases provided in a server device for access by many users, and small ones installed in personal computers for personal usage. The recent Multi-Function Peripherals have functions of storing documents in built-in hard disk drives (HDD), and thus, the image document databases can be installed in the Multi-Function Peripherals.

Some of the image document databases have searching functions allowing users to find a desired image document from the large amount of image documents. For example, currently, a frequently-used searching technique involves searching the whole text by using character recognition results given by an Optical Character Reader (OCR) process as keywords, or involves conceptual search.

However, the above-mentioned searching technique is text-based, and suffers from the following problems: (1) accuracy of the searching depends on the OCR accuracy; (2) keywords have to be used for searching; (3) when there are a large number of hits (namely, candidates), it is not easy to narrow the range of the hits.

As for problem (1), since presently it is not guaranteed that the characters recognized by OCR are 100% correct, if the input searching keywords, which are obtained by OCR, include incorrect characters due to misrecognition by OCR, the desired image document cannot be found.

As for problem (2), in the text-based searching, one has to use the keywords. When the user knows the appropriate keywords, there is not any inconvenience, but, for example, when searching for an object completely unknown to the user, such as a kind of Web site on the Internet, or when searching for a document created a few years ago, if the user has forgotten the appropriate keywords, the user cannot execute searching appropriately if he cannot think of good keywords.

Further, if the document only has pictures or graphics, but does not have text, certainly, searching with keywords is useless.

As for problem (3), in the text-based searching, it is difficult to rank the keywords, and candidates satisfying the keywords are treated equally. For this reason, when there are a large number of hits (candidates), one has to confirm the large number of hit image documents one by one, and this is quite cumbersome.

Among the methods for searching for image documents, there is a method involving searching for similar images, and an image classification method in which the image documents are classified into plural categories to gradually narrow the range of the image documents to be searched.

For example, Japanese Laid-Open Patent Application No. 2000-285141 (hereinafter, referred to as "reference 1") discloses a similar image searching method. Specifically, reference 1 discloses an image searching method in which feature quantities of a query image are calculated from color, outline, or pattern, or other image attributes; then weight factors are assigned to the respective feature quantities, and similarities between the feature quantities and the query image are calculated and are ranked.

A problem in the similar image searching method is that the query image needs be used as a searching key. If an image at hand is used as the query image, there is not any convenience; but when using an image in an image database as the query image, it is necessary to first search for the query image, and this is not convenient.

The image classification method has good operability because one just needs to select a classified image category. For example, Japanese Laid-Open Patent Application No. 10-162020 (hereinafter, referred to as "reference 2") discloses an invention in which the image classification method is applied to image documents. Specifically, in the invention disclosed in reference 2, images are classified into categories based on features extracted from an input image, and typical images of different categories are presented to the user. When the user selects an image, further, images of sub-categories are presented to the user. In this way, the range of the images is narrowed step by step, and the desired images can be determined with only a small number of steps.

However, in image classification of image documents having various attributes, in a classification sequence involving a uniquely defined and fixed classification key (feature quantity), sometimes the classification in the sub-category cannot be performed appropriately. Since the image documents have great variety, depending on the document type, sometimes image classification with image layouts is effective, and sometimes image classification with color or background color of the image is effective. For example, as for an image group of image documents each having white backgrounds, it is not appropriate to perform image classification with color; and for bills having the same format, it is not appropriate to perform image classification with image shape or layout.

SUMMARY OF THE INVENTION

An embodiment of the present invention may solve one or more problems of the related art.

A preferred embodiment of the present invention may provide an image processing device and an image processing method which classify images in an image document database and display the classified images to search for a target image, and are able to easily narrow the range of candidate images, improve operability, allow a user to select a desired classification key, and enable selection of an optimum classification key under any searching conditions.

According to an aspect of the present invention, there is provided an image processing device capable of searching for an image document stored in an image database, comprising:

a first classification unit that classifies image documents in the image database into a plurality of categories;

a display image controller that generates a display image for displaying a status of the classification performed by the first classification unit;

a second classification unit that enables a user to select one or more categories among the plural categories included in the display image, and classifies image documents included in one of the categories selected by the user;

a detection unit that detects a searching status; and a classification key selection unit that selects a classification key for the second classification unit in response to detection results of the detection unit.

According to the present embodiment, for example, the image processing device classifies a known image, relying on a vague memory of a user, from an image document database, and displays the classified images, so as to search for the image. Namely, the image processing device of the present invention has the function of document classification. The image processing device of the present invention detects a searching status, and, in response to detection results, performs classification by using an effective classification key; thereby, it is possible to effectively narrow the range of the candidate image documents, and quickly find the desired image document. As a result, operability is improved, and it is possible to perform image searching friendly to users.

These and other objects, features, and advantages of the present invention will become more apparent from the following detailed description of preferred embodiments given with reference to the accompanying drawings.

BRIEF DESCRIPTION OF THE DRAWINGS

FIG. 9A is a table illustrating a relationship between previous classification keys and the number of documents in a selected category in the present embodiment;

FIG. 9B is a table illustrating a relationship between the selected classification keys and the number of documents in the selected category in the present embodiment;

DESCRIPTION OF THE PREFERRED EMBODIMENTS

Below, preferred embodiments of the present invention are explained with reference to the accompanying drawings.

First Embodiment

Figure 1:
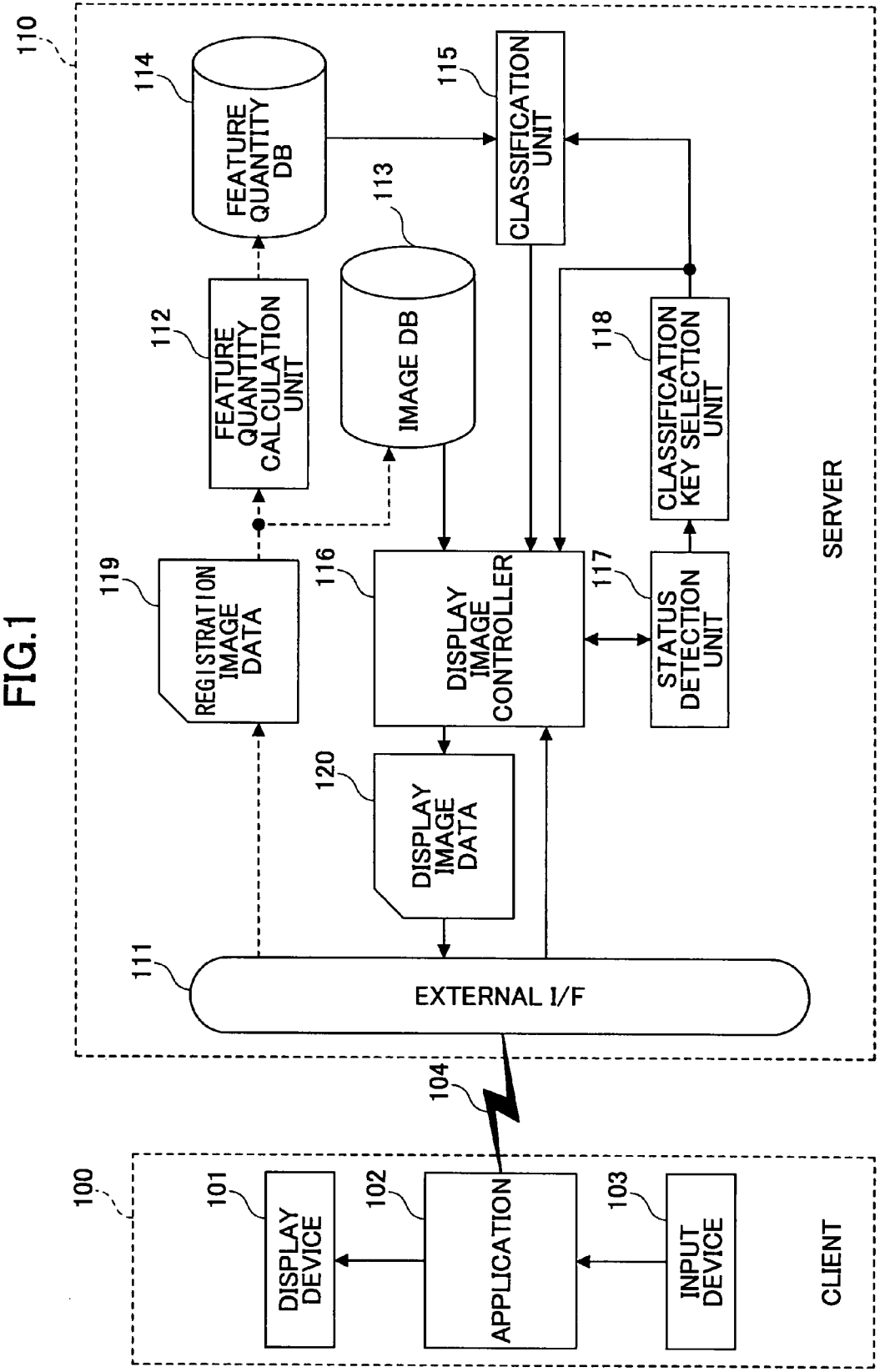
FIG. 1 is a block diagram illustrating a configuration of an image processing system according to a first embodiment of the present invention.

FIG. 1 is a block diagram illustrating a configuration of an image processing system according to a first embodiment of the present invention.

The image processing system shown in FIG. 1 includes a personal computer (PC) 100 which is a client device of a PDA (Personal Digital Assistant), a mobile phone, or other mobile terminals, and a server device 110 which classifies documents responsive to commands from the client device 100, and outputs the classification results to the client device 100.

The personal computer (PC) 100 includes a display device 101 such as a monitor; an application program 102 which performs interpretation of user's commands, communications with a server 110, or control of the display device 101; an input device 103 which is a keyboard or a mouse for a user to input instructions; and an external communication path 104, such as a LAN or the Internet.

The server device 110 includes an external interface (I/F) 111 with the communication path 104; a feature quantity calculation unit 112 which calculates a feature quantity from an input image document; an image document database (DB) 113 which stores registration images 119; a feature quantity database (DB) 114 which stores feature quantities of the images stored (registered) in the image document database (DB) 113; a classification unit 115 which classifies the image documents according to the feature quantities stored in the feature quantity database (DB) 114; a display image controller 116 which generates an image to be displayed by the client device 100 from the classification results of the classification unit 115; a status detection unit 117 which retains or detects current display conditions, classification keys, and classification categories selected by the user; and a classification key selection unit 118 which selects a classification key based on the detection results of the status detection unit 117.

Registration image data 119 represent image data to be registered in the image document database (DB) 113. Display image data 120 represent image data to be displayed on the display device 101 of the client device 100.

In FIG. 1, dashed arrow lines represent the data flow during image registration, and solid lines represent the data flow during the document classification and generation of the display images.

Figure 2:
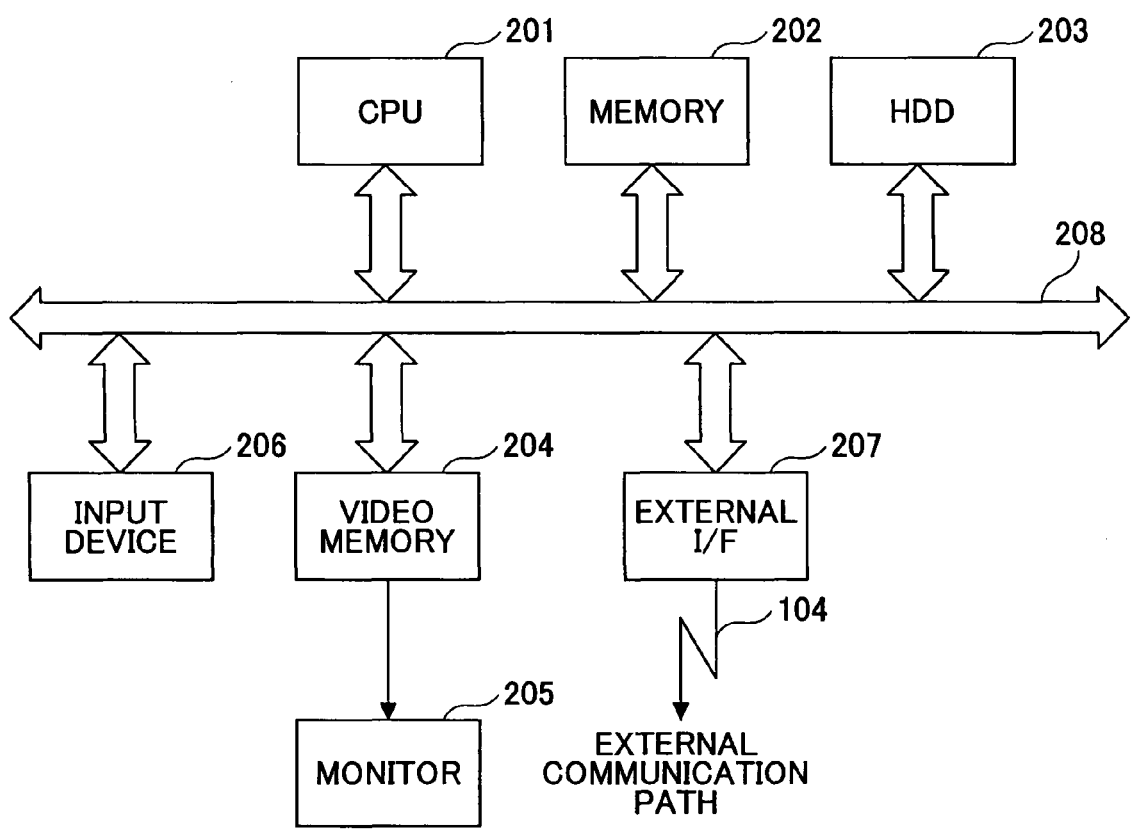
FIG. 2 is a block diagram illustrating an example of a configuration of the server device 110.

FIG. 2 is a block diagram illustrating an example of a configuration of the server device 110.

As shown in FIG. 2, the server device 110 includes a CPU 201 for performing calculations and processing responsive to a program being executed, a volatile memory 202 which serves as a working area for temporarily storing and retaining codes of the program, coded data of an image, and so on, a hard disk drive 203 which stores image data or programs, such as the image database 118, the feature quantity database 117, a video memory 204 which serves as a data buffer for displaying images on a monitor 205, an input device 206 which is a keyboard or a mouse, and an external interface (I/F) 207 for transmitting or receiving data through the external communication path 104, such as a LAN or the Internet, and a bus 208 which connects the above components.

In the present embodiment, for example, the server device 110 is formed from a computer, and image document classification or other processing is performed by software. Namely, processing performed in the server device 110 is realized by not-illustrated application programs. It should be noted that the present embodiment is not limited to this. For example, the image document classification and other processing can be performed by hardware installed in the MFP or other devices. Alternatively, even without the server-client configuration, for example, the configuration shown in FIG. 1 may be included in one PC or one MFP.

Below, operations of the system shown in FIG. 1 are explained.

Primarily, the image document database 113 is involved in two kinds of operations. One is registration of the image documents, and the other one is searching for, viewing, and acquisition of a desired image document; in other words, usage of the image documents in the image document database 113. Here, acquisition of the desired image document means downloading the desired image document from the server device 110.

In usage of the image documents in the image document database 113, searching for the desired image document is indispensable; after searching, a viewer application is used to view the desired image document, and the desired image document is stored in a PC of a user.

Below, operations of registration and searching for the image documents are explained.

Figure 3:
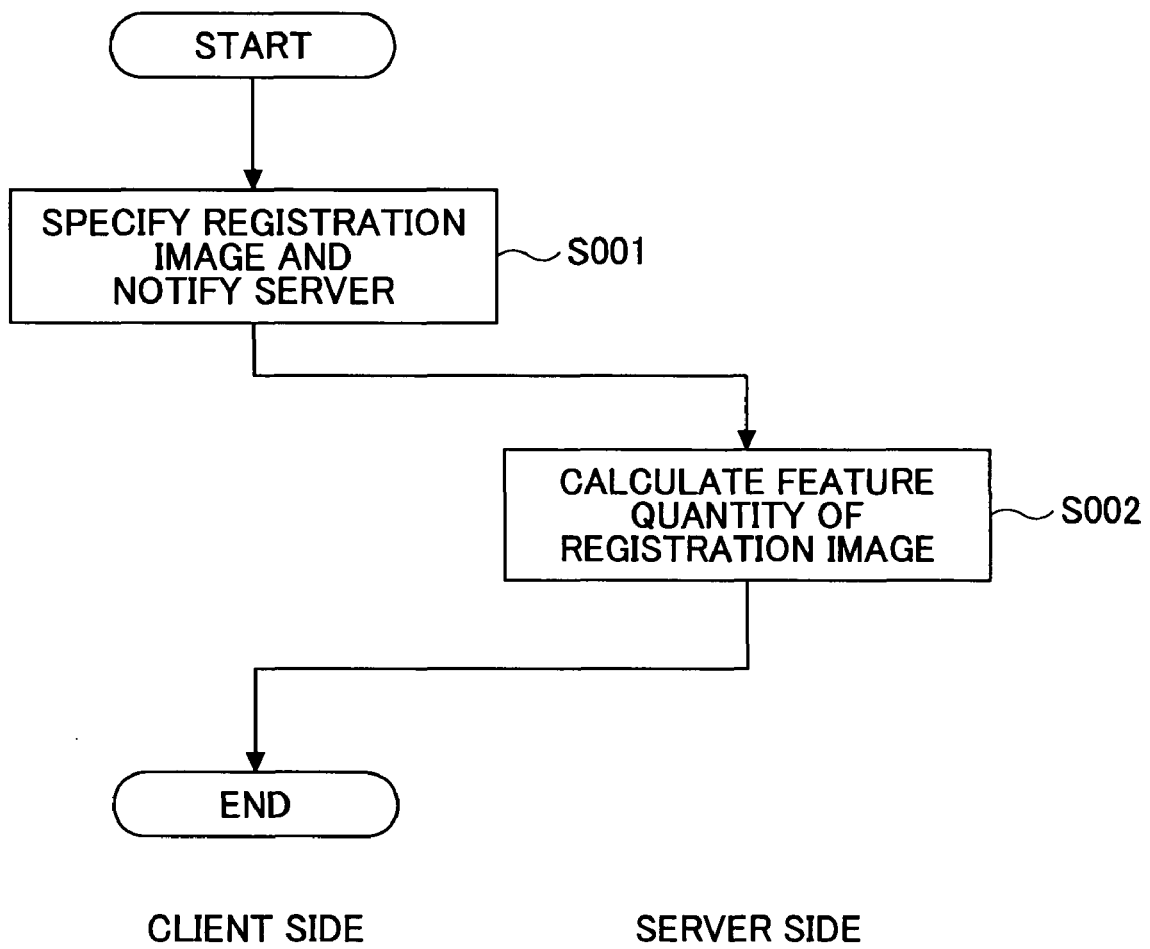
FIG. 3 is a flowchart illustrating operations when registering the image documents.

FIG. 3 is a flowchart illustrating operations when registering the image documents.

Below, explanations are made with reference to FIG. 1, in which dashed arrow lines represent the data flow during image registration, and FIG. 3.

As shown in FIG. 3, in step S001, the user issues a command from the client device 100 by the application program 102 for registration of image data in the server device 110; in addition, the user specifies the registration image data 119 to be registered.

In step S002, the specified registration image data 119 are input to the server device 110 through the external communication path 104, and are registered in the image document database 113 through the external interface 111. At the same time, the feature quantity calculation unit 112 calculates the feature quantity of the registration image data 119, and stores the obtained feature quantity in the feature quantity database 114. In this step, the registration image data 119 in the image document database 113 and the feature quantity in the feature quantity database 114 are stored in connection with each other by using ID numbers or other keys. In addition, as long as the image document database 113 and the feature quantity database 114 have the above functions, the image document database 113 and the feature quantity database 114 can be arranged in the same database which is configured to have a hierarchical data structure, for example, by using the XML (extensible Markup Language) language. Alternatively, the image document database 113 and the feature quantity database 114 can be arranged in different databases provided in different servers. Further, the registration of the image data can be performed by directly registering the image data from a scanner or a digital camera or other image input devices into the server device 110.

Figure 4:
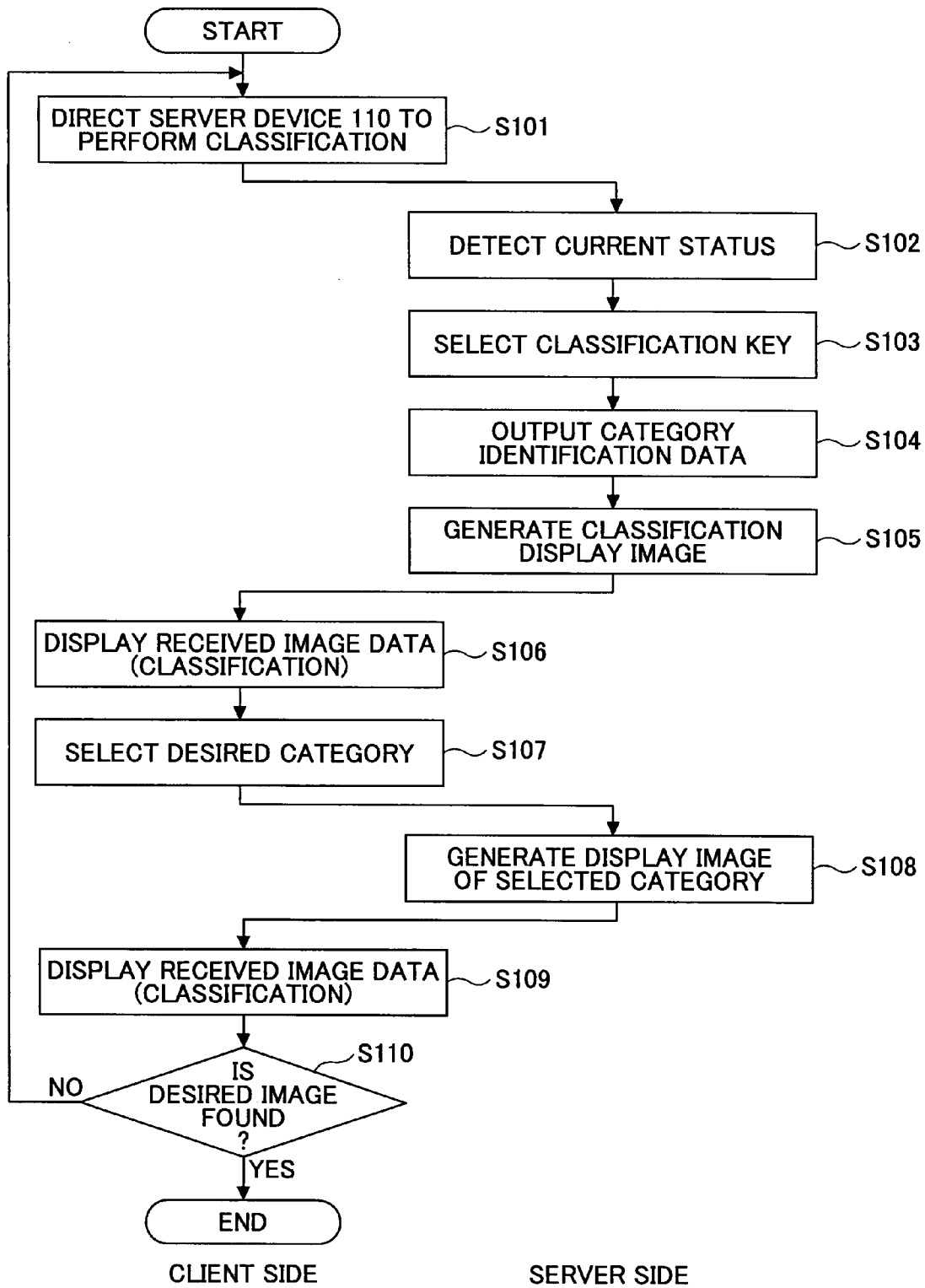
FIG. 4 is a flowchart illustrating operations when searching for the image document.

FIG. 4 is a flowchart illustrating operations when searching for the image document.

Below, explanations are made with reference to FIG. 1 and FIG. 4.

As shown in FIG. 4, in step S101, the user executes the application program 102 on the client device 100, and directs the server device 110 to perform document classification. For example, a graphic image as shown in FIG. 5, which includes a summary of thumbnail-size images, can be displayed on the display device 101 of the client device 100, and the user can issue commands through the graphic image displayed on the display device 101.

Figure 5:
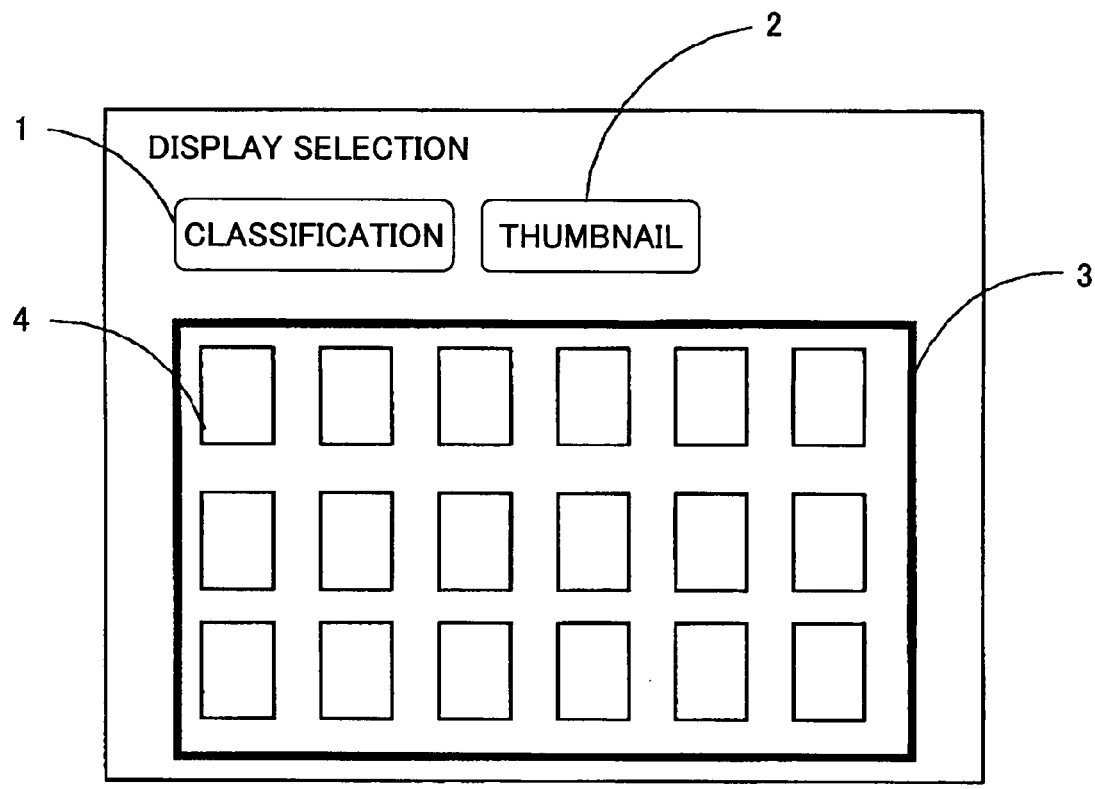
FIG. 5 is a diagram illustrating an example of the graphic image displaying the summary of the thumbnail-size images in the present embodiment.

FIG. 5 is a diagram illustrating an example of the graphic image displaying the summary of the thumbnail-size images in the present embodiment.

As shown in FIG. 5, there are a classification radio button 1 which indicates a document classification operation, a thumbnail radio button 2 for displaying a thumbnail displaying screen, a frame 3 indicating the document image, and thumbnail-size images 4 of the document images.

In FIG. 5, plural thumbnail-size images 4 are displayed in the frame 3 in a matrix manner. This technique is frequently used in an image database.

Usually, many images are registered in the image document database 113. When all of the thumbnail-size images of the registered images cannot be displayed at one time, for example, sliders can be provided on the upper side or the lower side of the frame 3 to scroll the display when viewing the screen, and provide the page-feeding function to change the thumbnail-size images to be displayed.

The user can use a pointing device such as the mouse of the input device 103 to click on the classification radio button 1, thereby sending the document classification command to the server device 110 through the external communication path 104.

Returning to FIG. 4, in step S102, when the server device 110 receives the document classification command, the status detection unit 117 detects current status of the display screen or selection status made by the user.

In step S103, the status detected by the status detection unit 117 is input to the classification key selection unit 118, and the classification key selection unit 118 selects a classification key responsive to the detected status. The classification key indicates the manner of document classification.

In step S104, the classification unit 115 receives the feature quantities from the feature quantity database 114, and outputs category identification data of the respective registration images responsive to the selected classification key.

In step S105, the display image controller 116 receives the classification results from the classification unit 115 (namely, the category identification data of each of the registration images) and the classification key selection data, and counts the number of the image documents of each category, and thus determines the layout of the display screen or the image data to be displayed.

Next, the display image controller 116 receives data of the images to be displayed or the thumbnail-size images of the images to be displayed from the image document database 113, generates the display image data 120 for displaying the classification results, and sends the display image data 120 to the client device 100 through the external interface 111 and the communication path 104.

The display image controller 116 can also retain searching status data, such as history data of the classification keys, the number of the documents of each category, and the category selected by the user.

Figure 6:
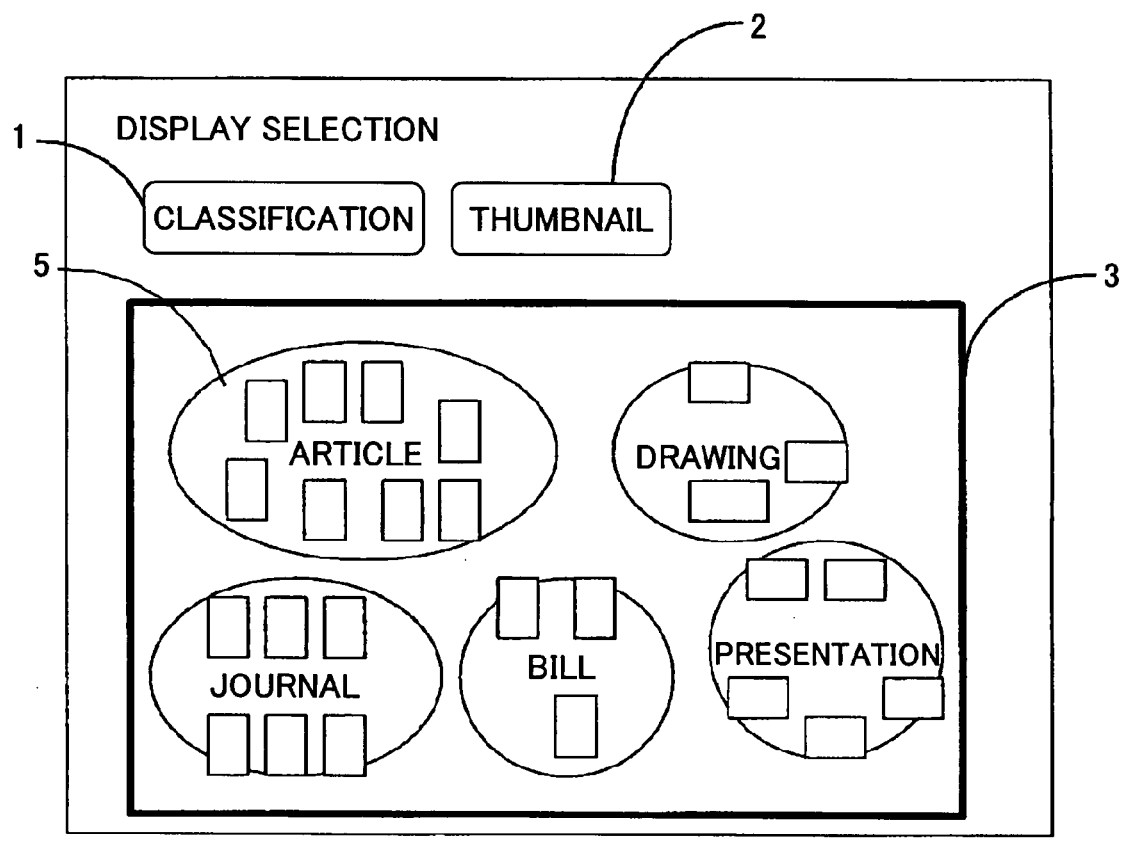
FIG. 6 is a diagram illustrating an example of the graphic image displaying document classification in the present embodiment.

FIG. 6 is a diagram illustrating an example of the graphic image displaying document classification in the present embodiment.

For illustrative purpose, FIG. 6 shows a screen indicating results of the first classification, in other words, all of the registration image documents in the image document database 113 are displayed. In addition, in the classification shown in FIG. 6, the type of the documents is used as the classification key.

As shown in FIG. 6, the reference number 5 represents classification categories. In FIG. 6, the image documents are classified into five categories, that is, article, drawing, journal, bill, and presentation; the size of the ellipse schematically indicates the number of documents of each category, and the thumbnail-size images in each category are associated with the image documents included in the category. It should be noted that the number of documents of each category may also be indicated directly by figures.

When the number of the image documents registered in the image document database 113 is small, all of the image documents are displayed; when the number of the image documents registered in the image document database 113 is large, typical images of each category are displayed.

In this way, by adjusting the number of the image documents to be displayed, it is possible to reduce the time for display and the time for transmission through the external communication path 104 on the client device 100, and reduce the processing time on the server device 110. When a sufficiently high processing speed can be obtained, all of the image documents may be displayed by overlapping the images, or by providing sliders, or by other ways.

There are various methods of generating the display screen or of communications between the server device and the client device. For example, as a frequently used technique, the server device 110 may be a Web server, and realized by using techniques based on the World Wide Web. In addition, the display image data 120 may be described by HTML (Hyper Text Markup Language), and the application program 102 may be a commonly used Web browser.

Returning to FIG. 4, in step S106, the client device 100 displays the image 120 on the display device 101.

In step S107, the user selects a category close to the image documents to be searched by using the input device 103. The selected category data are sent to the server device 110. For example, assume the category of "presentation materials" as shown in FIG. 6 is selected. For example, a pointing device, such as a mouse, may be used to click the inside of the category "presentation" in FIG. 6; thereby, the category of "presentation" is selected. In addition, each category can be set to be selectable to non-selectable, and plural categories can be set to be selectable.

In step S108, in the server device 110, the display image controller 116 receives the command of category selection, generates a display image of a summary of the thumbnail size images of the selected category, and sends the display image data 120 to the client device 100.

In step S109, the client device 100 displays the display image data 120 as shown in FIG. 5 on the display device 101.

In step S110, the user searches the summary of the thumbnail size images as shown in FIG. 5 for a desired image, and when the user finds the desired image, the routine is finished. Nevertheless, when the number of the registration image documents in the image document database 113 is large, it is expected that there will be many images displayed in the summary of the thumbnail size images; namely, there are many registered presentation material images, and usually it is difficult to find the desired image. When the user cannot find the desired image, steps S101 to S109 are repeated.

Below, explanations are made of the operations of the second document classification focusing on differences from the first document classification. In the second classification, documents included in the category selected in the first classification are classified. Namely, the documents displayed in step S109 are classified. Due to this, it is possible to gradually narrow the range of the image documents to be searched, allowing the user to find the target document.

The status detection unit 117 detects information of the selected category, number of documents to be classified, and history data of classification keys. The classification key selection unit 118 selects the classification key for the second classification. Here, assume the category of "presentation materials" as shown in FIG. 6 is selected. Since presentation materials usually have characteristics in their background color, here, the classification key of color is selected.

Figure 7:
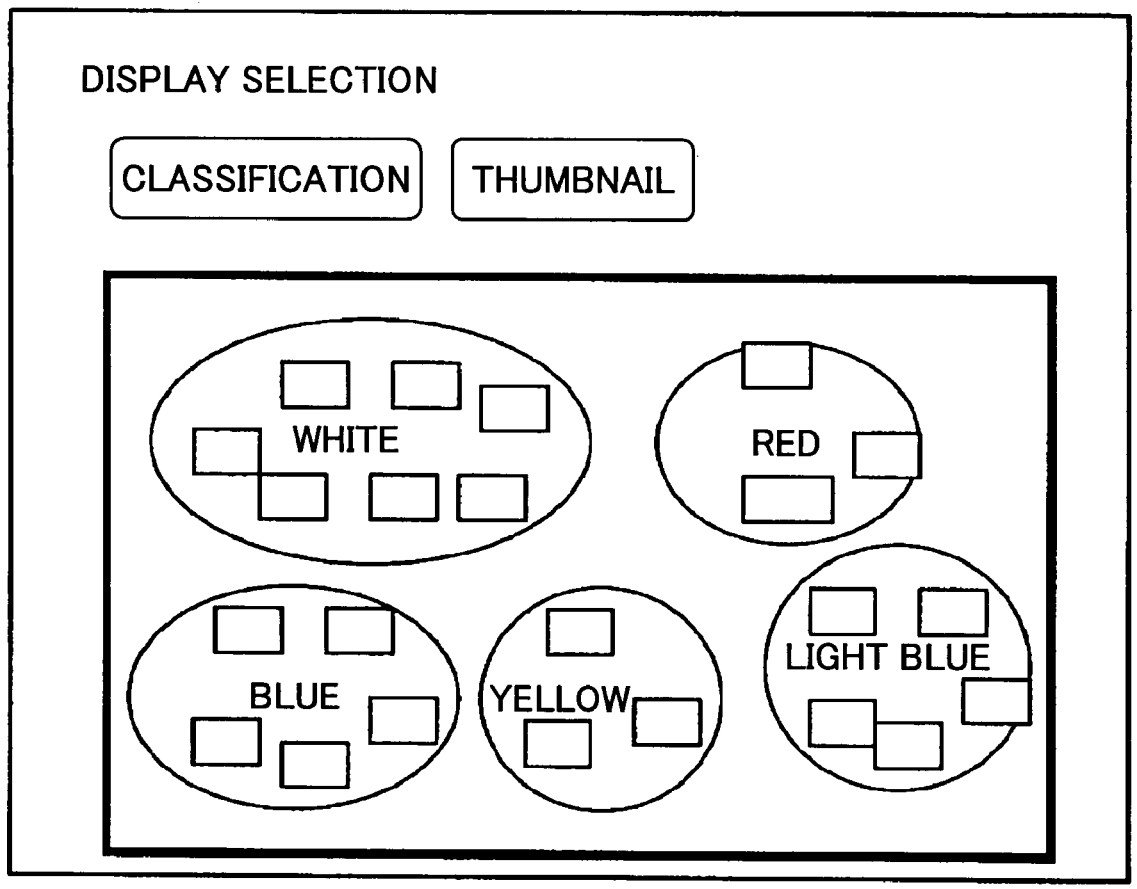
FIG. 7 is a diagram illustrating an example of the graphic image displaying document classification by color in the present embodiment.

FIG. 7 is a diagram illustrating an example of the display image for displaying document classification by color in the present embodiment.

In this way, by recursively performing classification display, it is possible to gradually narrow the range of the image documents to be displayed, and the user can gradually narrow the range of the image documents to be searched while confirming appearance or other features of the images even in an image database including a large number of registration image documents.

In the present embodiment, it is exemplified that transition to the next classification screen is performed by displaying thumbnail-size images of the selected category after selection of the category to be classified. Certainly, when the category includes a large number of documents, transition to the next classification screen can be performed automatically.

Figure 8:
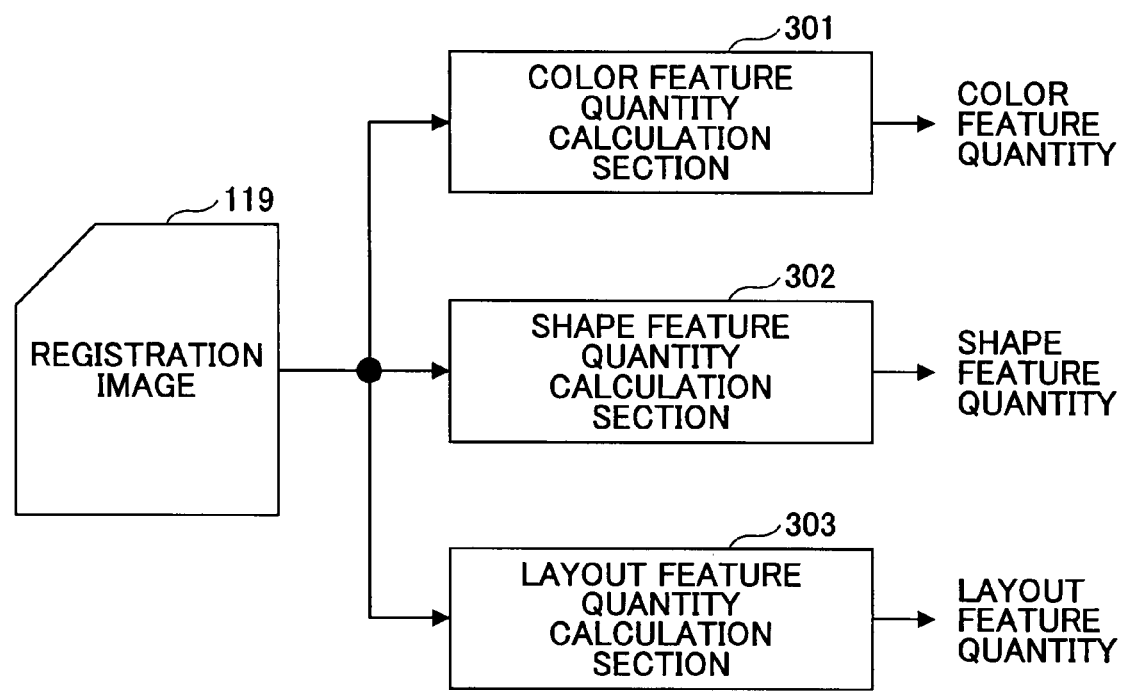
FIG. 8 is a block diagram illustrating a configuration of the feature quantity calculation unit 112 according to the present embodiment.

FIG. 8 is a block diagram illustrating a configuration of the feature quantity calculation unit 112 according to the present embodiment.

As shown in FIG. 8, the feature quantity calculation unit 112 includes a color feature quantity calculation section 301 which calculates a color feature quantity from the registration image data 119, a shape feature quantity calculation section 302 which calculates a shape feature quantity from the registration image data 119, and a layout feature quantity calculation section 303 which calculates a layout feature quantity from the registration image data 119.

The color feature quantity calculation section 301 calculates the color feature quantity from the registration image data 119, such as the background color of the image document, color distribution, and other color-related quantities.

The shape feature quantity calculation section 302 calculates the shape feature quantity from the registration image data 119, such as edges and textures of the image document, and other quantities related to the shape of the image document.

The layout feature quantity calculation section 303 divides an image into plural objects in units of image-elements, determines attributes of the objects to obtain layout information, and then calculates positions or areas corresponding to the object attributes, such as titles, characters, diagrams, photos, or tables. The above feature quantities can be calculated by well-known methods.

Below, explanations are made of operations of status detection and classification key selection.

FIG. 9A is a table illustrating a relationship between previous classification keys and the number of documents in a selected category in the present embodiment.

FIG. 9B is a table illustrating a relationship between the selected classification keys and the number of documents in the selected category in the present embodiment.

In the example shown in FIG. 9A and FIG. 9B, first, corresponding to the classification key prior to the current classification processing and the number of documents, the next classification key is selected as shown in FIG. 9A. When there is no previous classification key, namely, when the current classification is the first classification, the document type is selected as the classification key. When the previous classification key is layout, and the number of documents is large, the shape is selected as the classification key. When the previous classification key is the document type, corresponding to contents of the category selected by the user and the number of documents, as shown in FIG. 9A, a classification key is selected suitable to the document type of the selected category. The user repeats displaying of the classification screen and category selection, thereby, gradually the range of the image documents is narrowed, and finally the target image document can be found.

In this way, corresponding to the searching conditions, the document classification key is efficiently utilized for classification; thereby, it is possible to quickly find the target image document at an early stage.

Even in the recursive classification, the same way as shown in FIG. 9A and FIG. 9B may be used, but in this case, probably, an already-selected classification key might be selected again. Since selecting an already-selected classification key again is not useful, in this case, the classification keys in FIG. 9A and FIG. 9B may be changed according to a predetermined order of priority. For example, an order of priority is determined as "document type", "layout", "shape", and "color", when an already-selected classification key is selected again, a classification key of high priority may be selected from those unused classification keys according to the above order of priority.

It should be noted that the method of classification key selection is not limited to the above examples, but may have numerous modifications. In addition, in the above examples, for simplicity of explanations, the "layout" is used as one classification, key, but the present embodiment is not limited to this; for example, the layout may be divided into plural sub classification keys according to whether a specified attribute (presence of a photo or a diagram attribute, a document including only characters, and so on) exists, or according to positions of the attributes on a page.

Figure 10:
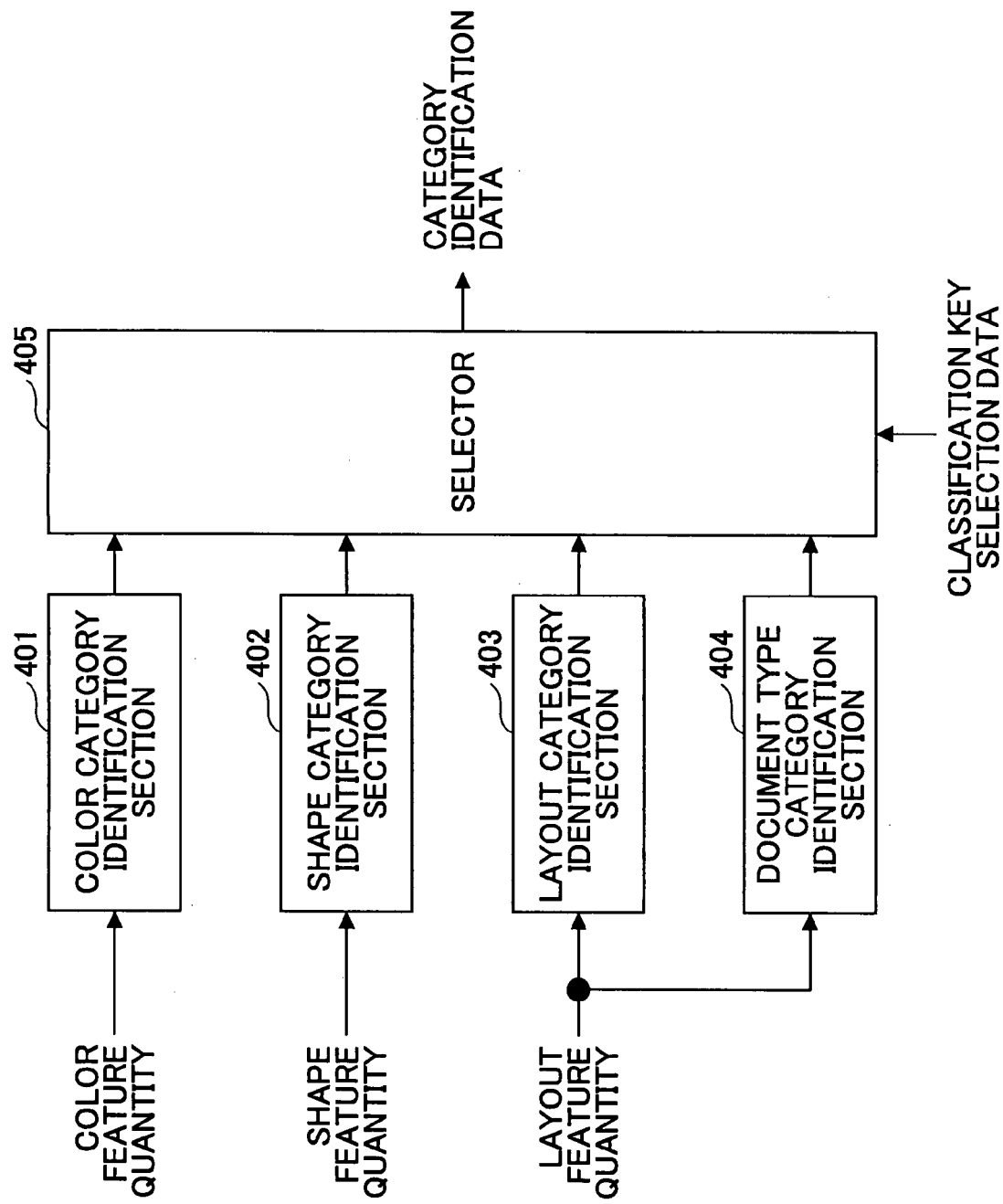
FIG. 10 is a block diagram illustrating a configuration of the classification unit 115 according to the present embodiment.

FIG. 10 is a block diagram illustrating a configuration of the classification unit 115 according to the present embodiment.

As shown in FIG. 10, the classification unit 115 includes a color category identification section 401 which receives the color feature quantity and identifies the color category, a shape category identification section 402 which receives the shape feature quantity and identifies the shape category, a layout category identification section 403 which receives the layout feature quantity and identifies the layout category, a document type category identification section 404 which receives the layout feature quantity and identifies the document type category, and a selector 405 which selects the category identification data output from the above category identification sections according to the classification key selection data output from the classification key selection unit 118.

The classification unit 115 receives feature quantities of the registration image data 119 from the feature quantity database (DB) 114, then the color category identification section 401, the shape category identification section 402, the layout category identification section 403, and the document type category identification section 404 perform category identification, and output category identification data of the registration image documents 119 corresponding to the selected classification keys.

Below, a method of the category identification is exemplified. It should be noted that the category identification may be performed in various ways but is not limited to this example.

The color category identification data may have color feature quantities with the background color or the most-frequently used color defined as the typical colors, and covers plural categories of red, blue, green, yellow, white, or other colors, so as to perform classification into the similar color.

The shape category identification section 402 performs classification from similarities of plural feature quantities such as edges or textures of the image documents.

Figure 11:
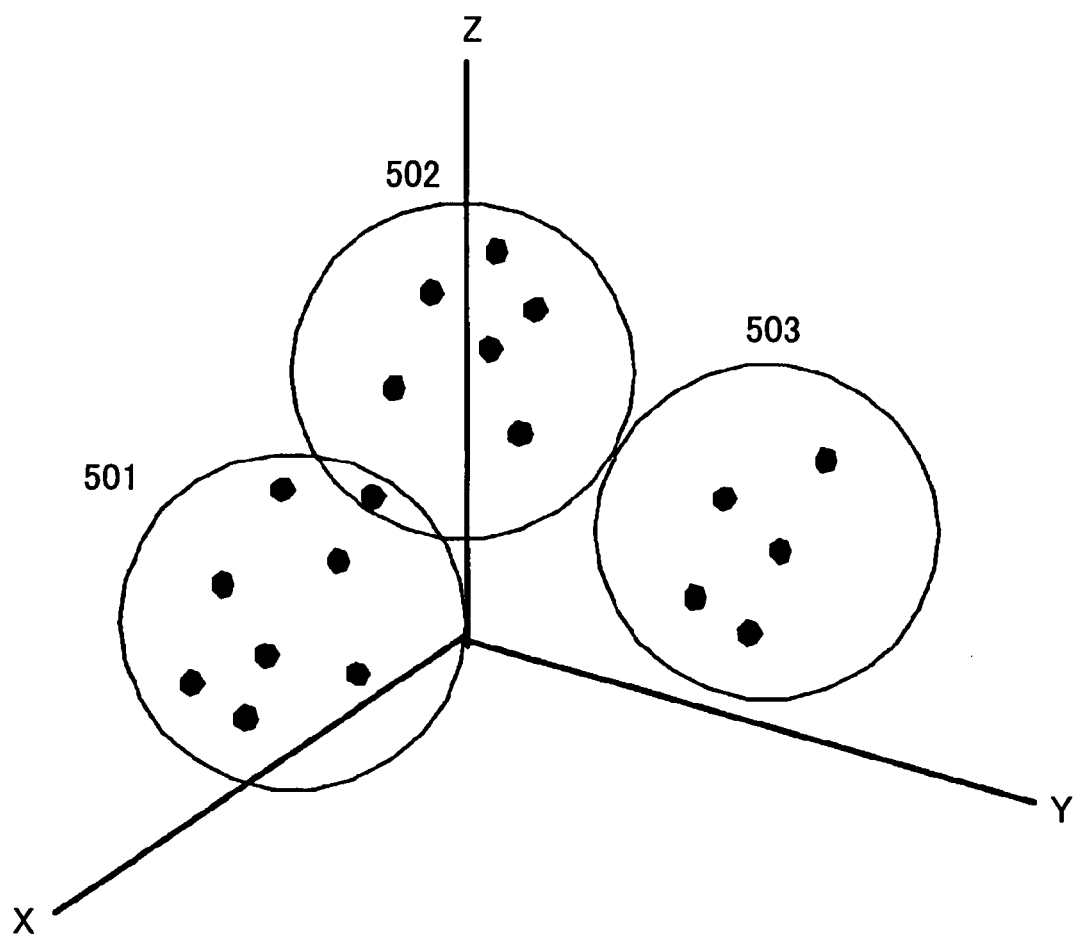
FIG. 11 is a diagram illustrating image groups in a feature space divided into categories.

FIG. 11 is a diagram illustrating image groups in a feature space divided into plural categories.

Specifically, in FIG. 11, classification is performed from three feature quantities X, Y, Z, and in the space with the feature quantities X, Y, Z as coordinate axes, the feature quantities of each set of the registration image data 119 are plotted. Those features close to each other are grouped into one category. In FIG. 11, it is exemplified that the feature space is classified into three categories 501, 502, and 503. Those features falling in both the category 501 and the category 502 are defined to belong to both the category 501 and the category 502. It is preferable to determine the center of a category in advance since the center of the category becomes a characteristic point of sampled image data of the category. In addition, weight factors may be assigned to the feature quantities, thereby, by modifying the feature quantity axes X, Y, and Z, it is possible to easily perform specific classification with certain features having large weights.

The layout category identification data can be classified in the same way as the shape category identification data.

The document type category identification data may be classified by biantennary exploratory classification by using document type properties, such as column setting of a document, from plural feature quantities of the layout feature quantities; alternatively, a pair of the layout feature quantity data and the correct answers to the document types to be identified can be remembered as teacher's data by a learning machine in advance, and the document type can be identified from the layout feature quantities by the learning data.

It should be noted that in the present embodiment, although it is exemplified that the image feature quantities are arranged into a database, and the document classification is performed when generating a classification screen, the present embodiment is not limited to this. For example, processing can be executed until the document classification can be determined at the time of image document registration, and the category identification data of different classification keys can be arranged into a database.

According to the present embodiment, with an image searching method based on image document classification in an image document database, the searching conditions are detected, and classification is performed accordingly by using effective document classification keys; thereby, it is possible to efficiently narrow the range of the image documents, and quickly find the target image document at an early stage. Thus, it is possible to provide an image processing device which is of improved operability and is user-friendly. In addition, by presenting the category to be classified and the number of documents included in the category when displaying the classification screen, it is possible to grasp the outline of all the documents included in the selected category or in the image document database, and improve the visibility of the image document group.

Second Embodiment

In this embodiment, a user is able to set a desired classification key to be selectable.

Figure 12:
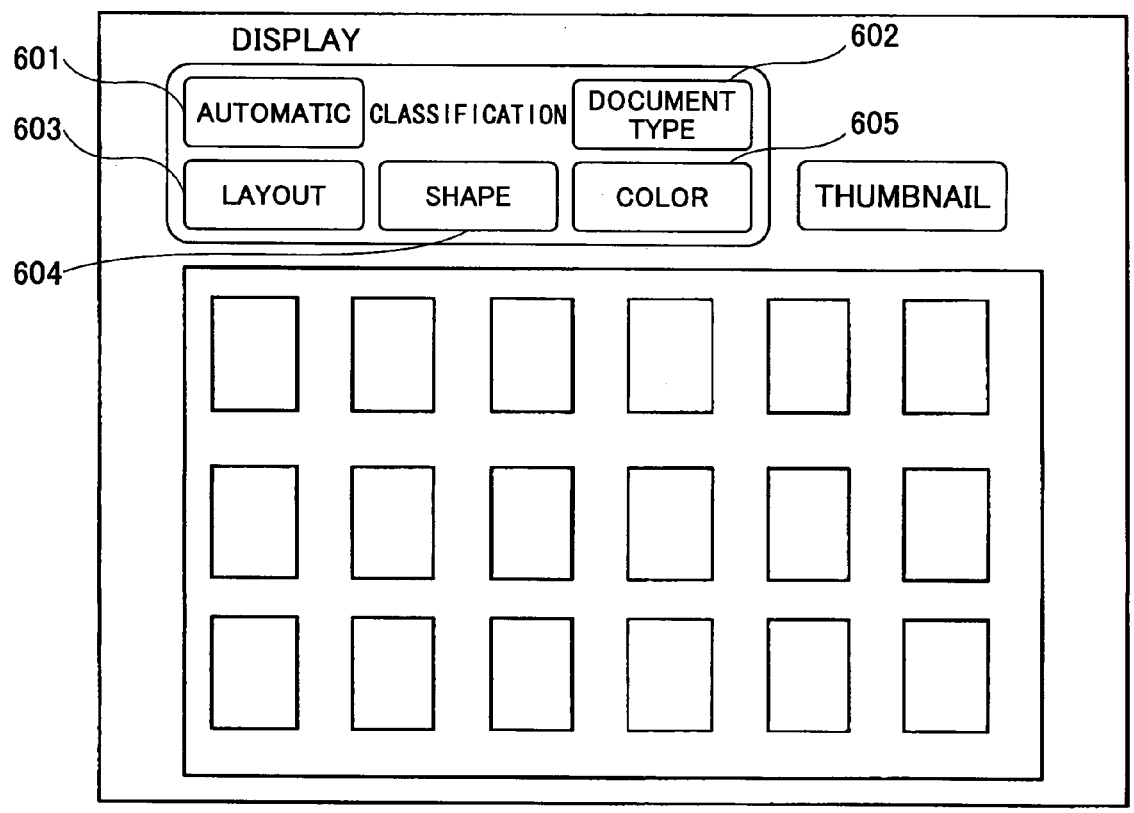
FIG. 12 is a diagram illustrating an example of the graphic image displaying the summary of the thumbnail-size images in a second embodiment of the present invention.

FIG. 12 is a diagram illustrating an example of a graphic image presenting the summary of thumbnail-size images according to a second embodiment of the present invention.

In the previous embodiment, as shown in FIG. 5, there is only one classification radio button 1 which starts a document classification operation. In the present embodiment, there are an automatic classification button 601 which has the same function as the classification radio button 1 in FIG. 5, a document type classification button 602, a layout classification button 603, a shape classification button 604, and a color classification button 605. Further, a user is able to set a desired classification key to be selectable. Due to this, for example, it is possible for the user to use a classification key for searching, which strongly impresses the user with respect to the target image to be searched for at the early stage of searching. In addition, by selecting the automatic classification button 601, it is possible to select a classification key suitable for the current searching conditions.

Third Embodiment

In this embodiment, data fluctuations are detected corresponding to each classification key of all image documents in a category selected by a user for selection of the classification key.

Figure 13:
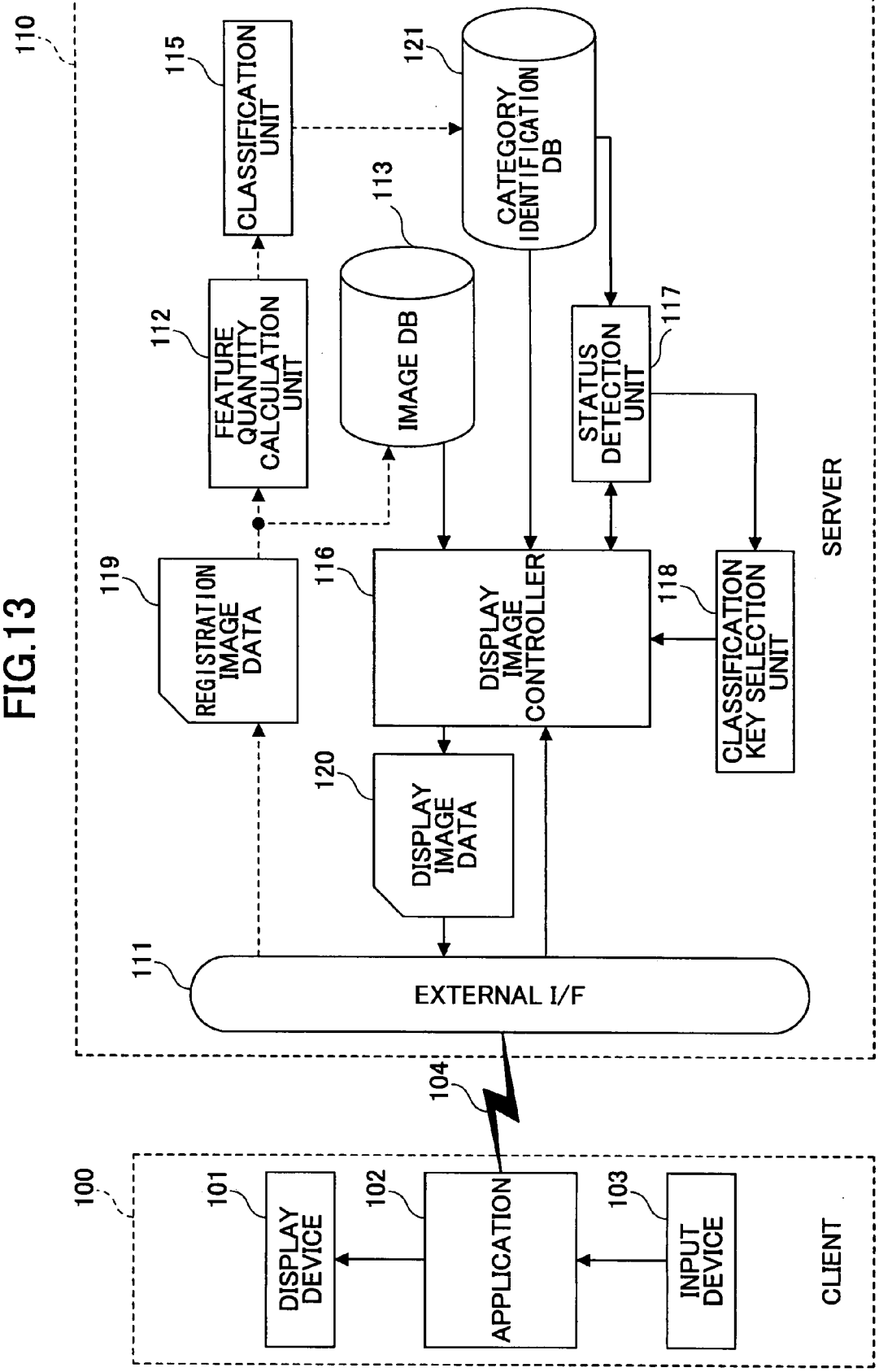
FIG. 13 is a block diagram illustrating a configuration of an image processing system according to a third embodiment of the present invention.

FIG. 13 is a block diagram illustrating a configuration of an image processing system according to a third embodiment of the present invention.

In the present embodiment, instead of storing the feature quantities in a database, category identification data may be arranged in a database. Alternatively, either the former or the latter may be adopted. In the present embodiment, selection operations in the selector 405 in the classification unit 115 as shown in FIG. 1 in the first embodiment are omitted, but category identification data of all classification keys for each image document are output, and are stored in a category identification database 121. Due to this, at the stage of generating the display image, it is not necessary to perform classification, and this can improve the processing speed.

The other components of the image processing system according to the present embodiment than the above are the same as that of the first embodiment. below, only the differences between the present embodiment and the first embodiment are explained.

In the present embodiment, the status detection unit 117 receives information of the registration image data to be classified from the display image controller 116, and detects data fluctuations of selectable classification keys.

For example, "information of the registration image data to be classified" may be the identification data of the registration image data in the category selected by the user. When generating the first classification screen during searching processing, the "registration image data to be classified" correspond to all image documents registered in the image document database (DB) 113; after classification by using the document type, and when the user selects the category of presentation materials, the "registration image data to be classified" correspond to the registration image data included in the category of presentation materials.

Further, "selectable classification keys" means classification keys not used in document classification. For example, when generating the first classification screen during searching processing, the "selectable classification keys" correspond to all of the classification keys; when only the document type classification key is executed, the "selectable classification keys" correspond to the classification keys other than the document type classification key.

The magnitude of the data fluctuations of each classification key can be quantitatively measured in various ways. In the present embodiment, as an example, information entropy is calculated to measure the data fluctuations.

Figure 14:
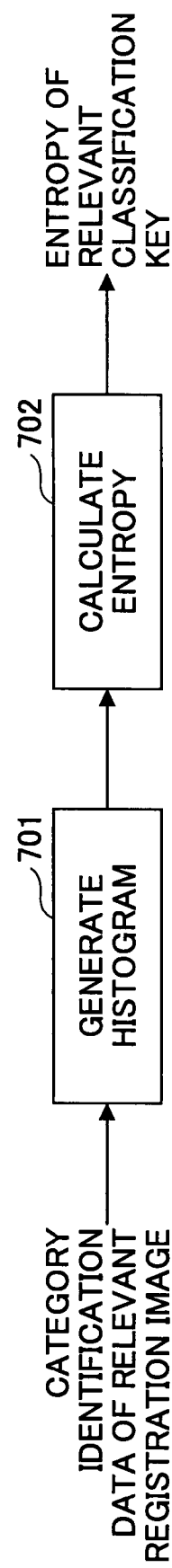
FIG. 14 is a block diagram illustrating a configuration of the status detection unit 117 according to the present embodiment.

FIG. 14 is a block diagram illustrating a configuration of the status detection unit 117 according to the present embodiment.

As shown in FIG. 14, the status detection unit 117 includes a histogram generation section 701 and an entropy calculation section 702.

In the present embodiment, the status detection unit 117 receives the category identification data of relevant registration images, which are to be classified, for each of the selectable classification keys, and the histogram generation section 701 creates a histogram and collects counts of categorized images of each category (frequency of categorized images of each category). After the histogram is created, the entropy calculation section 702 calculates the entropy based on the data of the histogram, and outputs the resulting entropy to the classification key selection unit 118. For all of the selectable classification keys, the entropy is calculated in the same way, and is output to the classification key selection unit 118.

The entropy H is calculated according to the following formula (1).

$$H = -\sum_{i=1}^{N} p_i \log p_i \qquad (1)$$

where N indicates the number of categories of the corresponding classification key, and $p_i$ indicates the percentage of the corresponding category among the whole categories (frequency of categorized images of the category).

The entropy of each classification key is output to the classification key selection unit 118, and the classification key selection unit 118 selects the classification key corresponding to the maximum entropy, and the selected classification key is input to the display image controller 116.

By using the selected classification keys, the display image controller 116 receives the category identification data of the registration images to be displayed from the category identification database 121, and generates a display image as in the first embodiment.

Figure 15A:
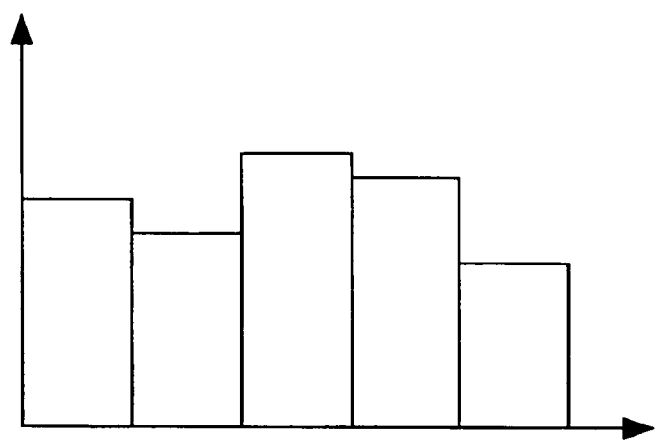
FIG. 15A and FIG. 15B are histograms of the category identification data of each classification key.
Figure 15B:
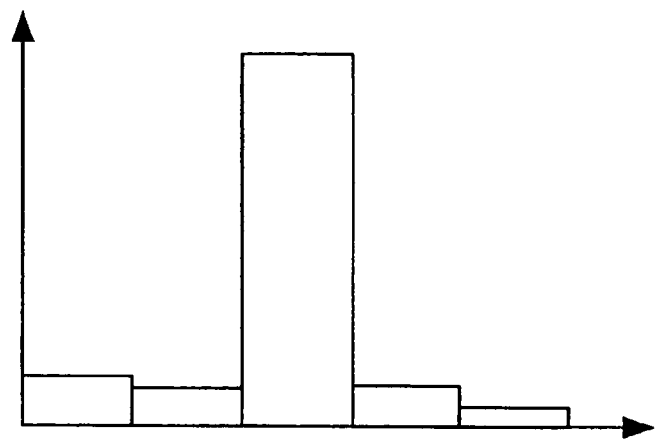

FIG. 15A and FIG. 15B are histograms of the category identification data of each classification key.

In FIG. 15A and FIG. 15B, the abscissa indicates the category, and the ordinate indicates the corresponding counts of categorized images of the corresponding categories.

As shown in FIG. 15A, while the counts of categorized images of the categories are not so different, the classification key has a large fluctuation. Whereas in FIG. 15B, while the counts of categorized images of the categories are much uneven, the classification key has a small fluctuation.

The entropy H corresponding to the graph in FIG. 15A is greater than the entropy H corresponding to the graph in FIG. 15B.

Since the image documents are classified according to the various classification keys, in the situation shown in FIG. 15A, regardless which category is selected, the number of documents can be reduced to be approximately $\frac{1}{5}*(1/\text{category number})$. Whereas in FIG. 15B, when a category having a small count is selected, the number of the documents can be reduced largely, but when the category having the large count is selected, the number of the documents is reduced little; hence, the overall reduction effect is small.

In other words, by selecting the classification key having large entropy, it is possible to select the classification key having large data fluctuation among the classification keys to be selected.

According to the present embodiment, with an image searching method based on image document classification in an image document database, it is possible to select the classification key having large data fluctuation among the classification keys to be selected, and by document classification with the classification key having large data fluctuation, it is possible to efficiently narrow the range of the image documents. In addition, the method of the present embodiment enables selection of the optimum classification key under any searching conditions, thus enables efficient document range narrowing, and improves operability.

It should be noted that although it is exemplified that the entropy can be calculated when generating the display image, it can also be performed at the time of image document registration.

According to the present embodiment, for example, the image processing device classifies a known image, relying on a vague memory of a user, from an image document database, and displays the classified images, so as to search for the image. Namely, the image processing device of the present invention has the function of document classification. The image processing device of the present invention detects a searching status, and, in response to detection results, performs classification by using an effective classification key; thereby, it is possible to effectively narrow the range of the candidate image documents, and quickly find the desired image document. As a result, the operability is improved, and it is possible to perform image searching friendly to users.

In addition, in the present embodiment, since the user is allowed to select the classification key, it is possible to use a classification key desired by the user; for example, the user can use a classification key of the candidate images for searching, which strongly impresses the user at the early stage of a searching process.

According to the present embodiment, it is possible to select a classification key from candidate classification keys, which is of large data fluctuation. Hence, by performing document classification using the classification key of large data fluctuation, it is possible to effectively narrow the range of the candidate image documents.

According to the present embodiment, it is possible to select an optimum classification key under any searching conditions, hence, it is possible to effectively narrow the range of the candidate image documents, and improve operability of image document searching.

While the present invention is described with reference to specific embodiments chosen for purpose of illustration, it should be apparent that the invention is not limited to these embodiments, but numerous modifications could be made thereto by those skilled in the art without departing from the basic concept and scope of the invention.

This patent application is based on Japanese Priority Patent Applications No. 2006-112912 filed on Apr. 17, 2006, the entire contents of which are hereby incorporated by reference.

What is claimed is:

1. An image processing device able to search for an image document stored in an image database, comprising:
a processor and a memory device;
a first classification unit that classifies the image documents in the image database into a plurality of categories;
a display image controller that generates a display image for displaying a status of the classification performed by the first classification unit;
a second classification unit that enables a user to select one or more of the plural categories included in the display image, and classifies the image documents included in the selected category;
a detection unit that detects a searching status; and
a classification key selection unit that selects a classification key for the second classification unit in response to the searching status; and
wherein the searching status detected by the detection unit includes data fluctuations for each classification key in documents in the selected category, and wherein information entropy is calculated to measure the data fluctuations.

2. The image processing device as claimed in claim 1, wherein the searching status includes numbers of documents in the categories.

3. The image processing device as claimed in claim 1, wherein the searching status includes a type of the category selected by the classification key selection unit.

4. The image processing device as claimed in claim 1, wherein the searching status includes the classification key selected by the classification key selection unit.

5. The image processing device as claimed in claim 1, wherein the classification key in the first classification unit and the second classification unit includes at least a type of a document.

6. The image processing device as claimed in claim 1, wherein the classification key in the first classification unit and the second classification unit includes at least a color of a document.

7. The image processing device as claimed in claim 1, wherein the classification key in the first classification unit and the second classification unit includes at least a shape of a document.

8. The image processing device as claimed in claim 1, wherein the classification key in the first classification unit and the second classification unit includes at least a layout of a document.

9. The image processing device as claimed in claim 1, wherein the second classification unit is recursively repeatedly operated.

10. The image processing device as claimed in claim 1, wherein the detection unit detects information of a selected category, number of documents to be classified, and history data of classification keys.

11. The image processing device as claimed in claim 1, wherein a layout feature quantity calculation section divides an image into plural objects in units of image-elements, determines attributes of the objects to obtain layout information, and then calculates positions or areas corresponding to the object attributes.

12. The image processing device of claim 11, wherein the object attributes include titles, characters, diagrams, photos or tables.

13. The image processing device of claim 1, wherein, when a previous classification key is the document type, a classification key is selected suitable to the document type of the selected category.

14. An image processing method able to search for an image document stored in an image database, comprising:
   a first classification step of classifying image documents in the image database into a plurality of categories;
   a display image control step of generating a display image to display a status of the classification performed in the first classification step;
   a second classification step of enabling a user to select one or more of the plural categories included in the display image, and classifying the image documents included in the selected category;
   a detection step of detecting a searching status; and
   a classification key selection step of selecting a classification key used in the second classification step in response to the searching status; and
   wherein the searching status detected by the detection unit includes data fluctuations for each classification key in documents in the selected category, and wherein information entropy is calculated to measure the data fluctuations.

15. The method of claim 14, wherein the image documents include articles, journals, bills, drawings and presentations.

* * * * *

UNITED STATES PATENT AND TRADEMARK OFFICE
CERTIFICATE OF CORRECTION

PATENT NO. : 8,086,045 B2
APPLICATION NO. : 11/783866
DATED : December 27, 2011
INVENTOR(S) : Koji Kobayashi et al.

It is certified that error appears in the above-identified patent and that said Letters Patent is hereby corrected as shown below:

On the title page, insert the following foreign priority data:

-- (30)    Foreign Application Priority Data

Apr. 17, 2006 (JP) .............................................. 2006-112912 --

Signed and Sealed this
Twenty-seventh Day of March, 2012

David J. Kappos
*Director of the United States Patent and Trademark Office*